No. 683,511. Patented Oct. 1, 1901.
C. F. SMITH & S. R. MUNSON.
BALL BEARING FOR FOOD CHOPPERS.
(Application filed Mar. 2, 1901.)
(No Model.)
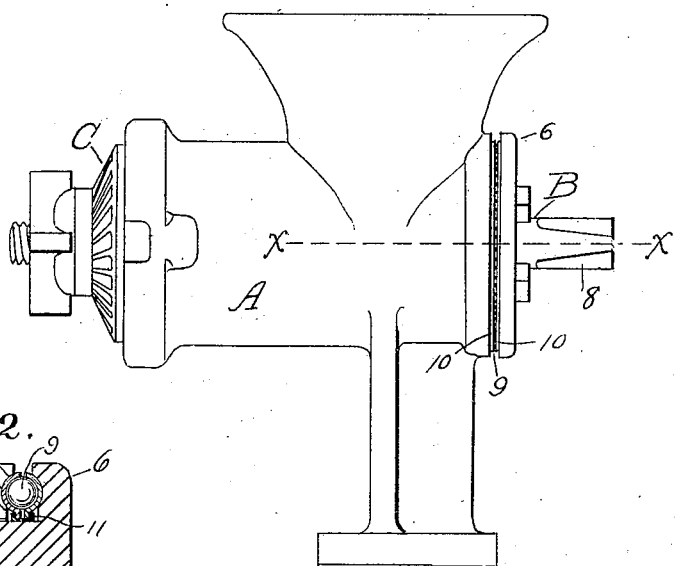
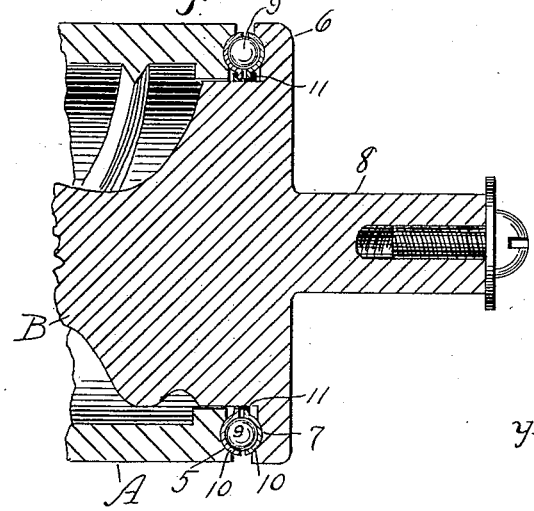
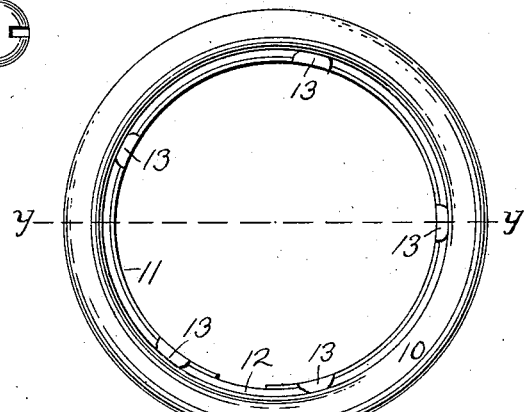
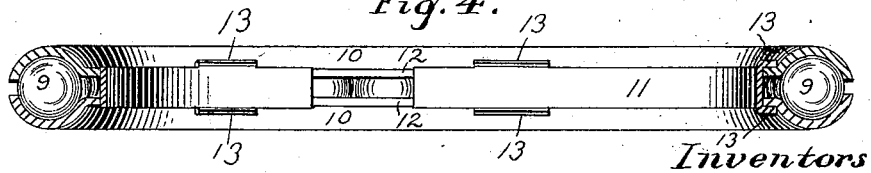
Witnesses
B. C. Woodford.
P. J. Egan
Inventors
Charles F. Smith.
Samuel R. Munson
By James Shepard
Atty.
THE NORRIS PETERS CO., PHOTO-LITHO., WASHINGTON, D. C.

UNITED STATES PATENT OFFICE.

CHARLES F. SMITH AND SAMUEL R. MUNSON, OF NEW BRITAIN, CONNECTICUT, ASSIGNORS TO LANDERS, FRARY & CLARK, OF SAME PLACE.

BALL-BEARING FOR FOOD-CHOPPERS.

SPECIFICATION forming part of Letters Patent No. 683,511, dated October 1, 1901.

Application filed March 2, 1901. Serial No. 49,560. (No model.)

*To all whom it may concern:*

Be it known that we, CHARLES F. SMITH and SAMUEL R. MUNSON, citizens of the United States, residing at New Britain, in the county of Hartford and State of Connecticut, have invented certain new and useful Improvements in Ball-Bearings for Food-Choppers, of which the following is a specification.

Our invention relates to improvements in ball-bearings for food-choppers and other machines; and the objects of our improvements are simplicity and economy in construction and convenience and efficiency in use.

In the accompanying drawings, Figure 1 is a side elevation of a food-chopper having our ball-bearing applied to crank end thereof. Fig. 2 is an enlarged horizontal section of a portion of the said machine and the bearings on the line X X of Fig. 1. Fig. 3 is a detached side elevation of our ball-bearing ring, and Fig. 4 is an enlarged sectional view of the same on the line Y Y of Fig. 3.

A designates a food-chopper or meat-cutter case, mainly of an ordinary form, the same having an opening for the screw-shaft or forcer B at one end. At the other end of the case and screw-shaft there are stationary and rotary cutters of any known construction, although only the cutter C, which is attached to and revolves with the shaft, can be seen in the drawings, Fig. 1. The crank end of the case is provided with a concave groove 5 outside of the shaft-opening, and the shaft is provided with a confronting collar or flange 6, formed integral with or placed on the said shaft, in the face of which flange is a similar groove 7. The end 8 of the screw or shaft B is fitted in any ordinary manner to receive a crank. (Not shown.) Our ball-bearing as a whole is detachable from the case, and we prefer to form the same of a series of balls 9, two annular shells or cases 10, and a spring-clip 11. For some purposes the convex form of the exterior of these shells is not essential; but that form is useful in order to enable them to be cheaply struck up from sheet metal and enable them to be cheaply fitted to the grooves in the end of the case and in the flange of the shaft. If the ball-bearing is designed to support the shaft axially, as well as to receive the thrust in an endwise direction, the form of the ring-receiving grooves and the exterior of the shells should be convex or an equivalent form for holding the ring or shells against radial movement. At one edge of the ring or shells, preferably the inner edge, we form a shoulder 12 for being engaged by the clip 11 for holding the shells together. This clip can be cheaply formed from sheet metal with wings or lugs 13 and bent into ring form, excepting that the ends of clip do not quite meet, and the lugs bent at right angles to project from one edge of the clip and hold the two shells by having the said lugs embrace the shoulders of the said shells. The spring-clip having disconnected ends is deflected inwardly to a smaller diameter than the inside of the ring, and when in proper position it is released and will force itself outwardly over the shoulders, as shown, by the resiliency of the metal. The ring is thus assembled with the balls inclosed therein, so that the complete ring, the shaft, and the case may be readily assembled by first passing the ring over the body of the screw-shaft and up to the flange and then inserting the shaft with ring thereon endwise into the case to the position shown. The ball-bearing takes the entire end thrust of the shaft in the direction toward the cutting end of the machine and also supports the flanged end of the shaft axially, so that the machine is free from the abrading or grinding action of the bearings that has heretofore been found in machines of this class having a bronze ring inserted between the flange on the screw-shaft and the end of the case. Our ball-bearing ring is especially useful in large-sized machines, where the flange is remote from the axis.

While we have shown the improvement in connection with a meat-cutter or food-chopper, we of course desire to hold the right given to all inventors by law of using our improvement in every machine to which the same is applicable.

We claim as our invention—

1. The combination of a case having one end open to receive a shaft and having a groove at the end of the case concentric with and outside of the said shaft-opening, with the shaft having a flange confronting the said grooved end of the case and having a groove in the confronting face of the said flange, and a ball-bearing ring with inclosed series of balls, inserted within and fitted to the grooves in the said confronting faces of the said flange and end of the case, substantially as described.

2. The combination of the case having the convex groove at the end with the flanged shaft having a concave groove in the face of the flange that confronts the said case, a pair of ball-inclosing shells having a convex exterior to fit the said grooves, and a series of balls within the said shells, substantially as described.

3. The combination of the ball-bearing shells having holding-shoulders at one edge with the series of balls inclosed by said shells, and a spring-clip having lugs for engaging the said shoulders and holding the shells together, substantially as described.

4. In a meat-chopper, the combination of the case having an opening at its crank end to receive the body of the shaft, and having a shell-receiving groove in the said end of the case surrounding the said opening, the shaft having a flange at its outer end in opposition to the said end of the case, a ball-bearing ring consisting of a series of balls, two annular shells inclosing the said balls, and means for holding the said two shells together for making the complete ring and balls detachably intact, each of the said shells being also confined exteriorly against movement transversely to the axis of the shaft, the shell adjacent to the end of the case being so held by fitting into the groove therein, substantially as described.

CHARLES F. SMITH.
SAMUEL R. MUNSON.

Witnesses:
L. A. LANDERS,
A. W. KEMPTON.